United States Patent
Schroeder et al.

(10) Patent No.: US 11,820,198 B2
(45) Date of Patent: Nov. 21, 2023

(54) METHOD FOR OPERATING A VEHICULAR REFRIGERATION SYSTEM HAVING A REFRIGERATION CIRCUIT WITH A HEAT PUMP FUNCTION

(71) Applicant: AUDI AG, Ingolstadt (DE)

(72) Inventors: Dirk Schroeder, Manching (DE); Christian Rebinger, Munich (DE); Helmut Rottenkolber, Mindelstetten (DE)

(73) Assignee: AUDI AG, Ingolstadt (DE)

( * ) Notice: Subject to any disclaimer, the term of this patent is extended or adjusted under 35 U.S.C. 154(b) by 350 days.

(21) Appl. No.: 17/258,276

(22) PCT Filed: Aug. 2, 2019

(86) PCT No.: PCT/EP2019/070918
§ 371 (c)(1),
(2) Date: Jan. 6, 2021

(87) PCT Pub. No.: WO2020/030556
PCT Pub. Date: Feb. 13, 2020

(65) Prior Publication Data
US 2021/0268868 A1 Sep. 2, 2021

(30) Foreign Application Priority Data
Aug. 7, 2018 (DE) ...................... 10 2018 213 232.1

(51) Int. Cl.
*B60H 1/00* (2006.01)
*F25B 41/20* (2021.01)
(Continued)

(52) U.S. Cl.
CPC ....... *B60H 1/0005* (2013.01); *B60H 1/00021* (2013.01); *B60H 1/00842* (2013.01);
(Continued)

(58) Field of Classification Search
CPC .............. B60H 1/0005; B60H 1/00021; B60H 1/00842; B60H 1/00885; B60H 1/00921;
(Continued)

(56) References Cited

U.S. PATENT DOCUMENTS 7,003,975 B2 * 2/2006 Feuerecker ........ B60H 1/00921
62/278
10,183,549 B2 * 1/2019 Koberstein ........ B60H 1/00385
(Continued)

FOREIGN PATENT DOCUMENTS

DE 10126257 A1 * 12/2002 ......... B60H 1/00885
DE 102009014349 A1 9/2010
(Continued)

OTHER PUBLICATIONS

German Examination Report dated Sep. 20, 2019 in corresponding German Application No. 10 2018 213 232.1; 20 pages; Machine translation attached.
(Continued)

*Primary Examiner* — Ljiljana V. Ciric
(74) *Attorney, Agent, or Firm* — Maier & Maier, PLLC

(57) ABSTRACT

A method for operating a refrigeration system for a vehicle, the refrigeration system including a refrigerant circuit with a heat pump function. The refrigerant circuit has an exterior heat exchanger, which is operated as a condenser or gas cooler to perform a refrigeration system mode or which is operated as a heat pump evaporator to carry out a heat pump mode. The refrigerant circuit further has an interior heating condenser or heating gas cooler for carrying out a heating mode. The interior heating condenser or heating gas cooler is fluidically connected downstream of the exterior heat exchanger with a reheating expansion device therebetween to carry out a reheating mode. The opening cross-section of the reheating expansion device is controlled in accordance
(Continued)

with a refrigeration system parameter indicating the required reheating power.

16 Claims, 2 Drawing Sheets

(51) Int. Cl.
| | |
|---|---|
| *F25B 41/24* | (2021.01) |
| *F25B 49/02* | (2006.01) |
| *B60H 1/32* | (2006.01) |
| *F25B 5/02* | (2006.01) |
| *F25B 13/00* | (2006.01) |
| *F25B 40/00* | (2006.01) |
| *F25B 25/00* | (2006.01) |
| *F25B 9/00* | (2006.01) |

(52) U.S. Cl.
CPC ..... *B60H 1/00885* (2013.01); *B60H 1/00921* (2013.01); *B60H 1/3213* (2013.01); *F25B 5/02* (2013.01); *F25B 13/00* (2013.01); *F25B 40/00* (2013.01); *F25B 41/20* (2021.01); *F25B 41/24* (2021.01); *F25B 49/02* (2013.01); *B60H 2001/0015* (2013.01); *B60H 2001/00928* (2013.01); *B60H 2001/00949* (2013.01); *B60H 2001/00957* (2013.01); *B60H 2001/3285* (2013.01); *B60H 2001/3291* (2013.01); *F25B 9/008* (2013.01); *F25B 25/005* (2013.01); *F25B 2309/061* (2013.01); *F25B 2313/003* (2013.01); *F25B 2313/021* (2013.01); *F25B 2313/02791* (2013.01); *F25B 2600/2513* (2013.01); *F25B 2700/195* (2013.01); *F25B 2700/197* (2013.01); *F25B 2700/1931* (2013.01); *F25B 2700/1933* (2013.01); *F25B 2700/21151* (2013.01); *F25B 2700/21152* (2013.01); *F25B 2700/21163* (2013.01); *F25B 2700/21175* (2013.01)

(58) Field of Classification Search
CPC .......... B60H 1/3213; B60H 2001/0015; B60H 2001/00928; B60H 2001/00949; B60H 2001/00957; B60H 2001/32912; B60H 2001/3285; F25B 13/00; F25B 2700/197; F25B 2700/21151; F25B 2700/21152; F25B 40/00; F25B 41/20; F25B 41/24; F25B 49/02; F25B 9/008; F25B 25/005; F25B 2309/061; F25B 2313/003; F25B 2313/021; F25B 2313/02791; F25B 2700/1933; F25B 2700/195; F25B 5/02; F25B 2700/21163; F25B 2700/21175; F25B 2600/2513; F25B 2700/1931

See application file for complete search history.

(56) References Cited

U.S. PATENT DOCUMENTS

| | | | | |
|---|---|---|---|---|
| 10,486,494 | B2 * | 11/2019 | Koberstein | ........ B60H 1/00899 |
| 11,267,318 | B2 * | 3/2022 | He | ..................... B60H 1/00907 |
| 11,279,205 | B2 * | 3/2022 | Schroeder | ............... F25B 41/24 |
| 2011/0174000 | A1 | 7/2011 | Richter et al. | |
| 2017/0182867 | A1 * | 6/2017 | Durrani | .............. B60H 1/00899 |
| 2018/0354342 | A1 * | 12/2018 | Miyakoshi | ........... B60H 1/3213 |
| 2020/0047591 | A1 * | 2/2020 | He | ..................... B60H 1/32284 |
| 2020/0370804 | A1 * | 11/2020 | Snider | ..................... F25B 13/00 |
| 2021/0268868 | A1 * | 9/2021 | Schroeder | .......... B60H 1/00921 |
| 2023/0073993 | A1 * | 3/2023 | Kim | .................. B60H 1/00921 |

FOREIGN PATENT DOCUMENTS

| | | | | |
|---|---|---|---|---|
| DE | 102009028522 | A1 | 5/2011 | |
| DE | 102010026353 | A1 | 6/2011 | |
| DE | 102010000990 | A1 * | 7/2011 | ......... B60H 1/00064 |
| DE | 102012108731 | A1 | 3/2014 | |
| DE | 102012108891 | A1 | 3/2014 | |
| DE | 112012004321 | T5 | 10/2014 | |
| DE | 102013021360 | A1 | 6/2015 | |
| DE | 102016115235 | A1 | 3/2017 | |
| DE | 102015122721 | A1 * | 6/2017 | ......... B60H 1/00028 |
| DE | 102016121362 | A1 | 5/2018 | |
| DE | 102017218424 | A1 | 4/2019 | |
| EP | 1262347 | A2 * | 12/2002 | ......... B60H 1/00885 |
| EP | 1262347 | B1 * | 11/2006 | ......... B60H 1/00885 |
| WO | WO-03057518 | A1 * | 7/2003 | ......... B60H 1/00914 |
| WO | 2011/029538 | A1 | 3/2011 | |

OTHER PUBLICATIONS

International Search Report (with English translation) and Written Opinion (with Machine translation) dated Nov. 26, 2019 in corresponding International Application No. PCT/EP2019/070918; 19 pages.

English-language translation of International Preliminary Report on Patentability dated Feb. 18, 2021, in corresponding International Application No. PCT/EP2019/070918; 9 pages.

* cited by examiner

METHOD FOR OPERATING A VEHICULAR REFRIGERATION SYSTEM HAVING A REFRIGERATION CIRCUIT WITH A HEAT PUMP FUNCTION

FIELD

The invention relates to a method for operating a refrigeration system for a vehicle having a refrigerant circuit having a heat pump function. The invention also relates to a refrigeration system for carrying out the method according to the invention.

BACKGROUND

DE 10 2016 121 362 A1 discloses a refrigeration system for a vehicle having a refrigerant circuit that is thermally coupled to at least one refrigerant circuit as a chiller. This refrigerant circuit configured for a combined mode in the pure refrigerant systems mode, in the heat pump mode and in the post-heating (reheating) mode for cooling, heating and post-heating (reheating) the supply air for a passenger compartment of the vehicle comprises a refrigerant compressor, a first refrigerant-air heat exchanger that can be operated as an evaporator or a condenser/gas cooler and a second refrigerant-air heat exchanger that can be operated as a condenser/gas cooler for conditioning the supply air, wherein the first and second refrigerant-air heat exchangers are arranged in an air conditioner. In heat pump mode, the refrigerant is depressurized from a high pressure level to an intermediate pressure level by means of an expansion valve associated with the first refrigerant-air heat exchanger, before it flows through the first refrigerant-air heat exchanger and only then it is depressurized to low pressure level by means of another expansion valve. Here, in the first refrigerant-air heat exchanger operated as a condenser/gas cooler, heat is transferred from the refrigerant to the supply air of the passenger compartment. Likewise, in the reheating mode, the refrigerant is depressurized from the high pressure level to an intermediate pressure level into this first refrigerant-air heat exchanger by means of the expansion valve associated with the first refrigerant-air heat exchanger. For this purpose, said expansion valve is used for setting a suitable intermediate pressure level of the refrigerant and thus a suitable evaporation temperature for dehumidifying the supply air of the passenger compartment. In said first refrigerant-air heat exchanger operated as an evaporator, the refrigerant is evaporated while absorbing heat. The refrigerant is then depressurized to the low pressure level in said another expansion valve.

A refrigeration system for a vehicle for conditioning the supply air for a passenger compartment is also described in DE 10 2012 108 891 A1. This refrigeration system comprises a housing with two flow channels for conducting air and a refrigerant circuit with an evaporator and a condenser, the evaporator being arranged in the first flow channel and the condenser being arranged in the second flow channel. The refrigeration system is configured both for cooling and heating the passenger compartment and for reheating mode. The respective operating mode is set only via the control of air conducting devices arranged within the housing of the refrigeration system and not via the regulation of the refrigerant circuit.

Furthermore, a refrigerant circuit of a refrigeration system for a vehicle according to DE 10 2009 028 522 A1 is configured for a combined refrigeration system and heat pump mode and for a reheating mode. In the heat pump mode, a first condenser/gas cooler is used as a heat pump evaporator to absorb heat from the ambient air and a second condenser/gas cooler is used as a heating register to heat the supply air of the passenger compartment. In the reheating mode, after flowing through the second condenser/gas cooler, the refrigerant is depressurized to an intermediate pressure level by means of an expansion device, which regulates the temperature level on the refrigerant side in the evaporator.

Finally, DE 10 2016 115 235 A1 discloses a refrigeration system for conditioning the supply air of a passenger compartment of a vehicle, which is configured for the refrigeration systems mode, in the heat pump mode and in the reheating mode. The different operating modes are set via the control of air flaps and air conducting devices.

SUMMARY

It is the object of the invention to provide a method for operating a refrigeration system for a vehicle having a refrigerant circuit, with which an improved reheating functionality can be provided. Furthermore, it is an object of the invention to provide a refrigeration system for performing the method according to the invention, which should be able to map said function completely through the refrigerant circuit, so that only a reduced additional heating effort, or in the optimal case, no additional heating effort with an electric heater is required to cover any shortfalls in heating demand.

Such a method for operating a refrigeration system for a vehicle having a refrigerant circuit having a heat pump function, wherein
- the refrigerant circuit has an exterior heat exchanger, which is operated as a condenser or gas cooler in order to perform a refrigeration system mode or as a heat pump evaporator in order to carry out a heat pump mode,
- the refrigerant circuit has an interior heating condenser or heating gas cooler for carrying out a heating mode,
- the interior heating condenser or heating gas cooler is fluidically connected to the exterior heat exchanger, downstream, by means of a reheating expansion device in order to carry out a reheating mode, wherein
- the opening cross-section of the reheating expansion device is controlled in accordance with a refrigeration system parameter indicating the required reheating power.

With such a method, it is possible to implement, via the control of the opening cross-section of the reheating expansion device, a large functional area of the refrigeration system, namely from exclusive cooling of the supply air of the passenger compartment of the vehicle to increased reheating of the cooled and dehumidified supply air in a large ambient temperature range with a wide variety of ambient load conditions. Furthermore, only little effort is required for this method according to the invention, since the reheating expansion device, as a central component, controls the main function, namely the reheating mode and thus the provision of a required amount of heat.

According to a preferred embodiment of the invention
- the refrigeration system is provided with an air conditioner which accommodates an evaporator and the interior heating condenser or heating gas cooler and has at least one temperature flap that can be pivoted between an open and closed position, wherein, in accordance with the position of the temperature flap, at least a partial air flow of the supply air flow flowing through the evaporator is passed over the interior heating condenser or heating gas cooler or the supply air flow flows completely around the interior heating condenser, the heating gas cooler in the bypass, and the position of the temperature flap is used as an air conditioning parameter.

Using such a temperature flap, at least a partial air flow of the cooled supply air is heated at the heating condenser or heating gas cooler in the reheating mode and mixed with the remaining supply air flow. The position of this temperature flap shows the need for reheating. If the temperature flap is only slightly open, for example, that is to say, only a small air mass flow is passed over the heating condenser or heating gas cooler, then there is only a small need for reheating. A wide or fully open temperature flap indicates a large or maximum need for reheating.

A particularly advantageous embodiment of the invention provides that an upper open position ($x_1$ position) and a lower open position ($x_2$ position, $x_2 < x_1$) are specified for the temperature flap for defining a position range, for an x position of the temperature flap with $x > x_1$, the opening cross-section of the reheating expansion device is reduced, and for an x position of the temperature flap with $x < x_2$, the opening cross-section of the reheating expansion device is enlarged.

If the position of the temperature flap indicates a large need for reheating, i.e. if the temperature flap is in an x position with $x > x_1$, the reheating expansion device is throttled, i.e. the opening cross-section is reduced, which means on the one hand less heat is released to the ambient air of the vehicle via the exterior heat exchanger, however, at the same time the high pressure in the heating condenser or heating gas cooler and thus also the temperature in the same and at the same time the reheating power or the reheating power potential increases. As a result, the x position of the temperature flap changes in the direction of the position range, i.e., the temperature flap is pivoted in the direction of its closed position.

If the position of the temperature flap indicates a low need for reheating, i.e., if the temperature flap is in an x position with $x < x_2$, the reheating expansion device is de-throttled, i.e. the opening cross-section is enlarged, which on the one hand leads to more heat being released to the ambient air of the vehicle via the exterior heat exchanger, however, at the same time the high pressure in the heating condenser or heating gas cooler and thus also the temperature in the same and at the same time the reheating power or the reheating power potential reduces. As a result, the x position of the temperature flap changes in the direction of the position range $x_2$ and higher, however $x < x_1$, i.e., the temperature flap is pivoted in the direction of its open position. Should eventually the need for reheating continue to decrease continuously, the reheating expansion device is de-throttled up to the maximum opening cross-section and moves the at least one temperature flap further toward closed while at the same time reducing air flow over the heating condenser or heating gas cooler until said heating condenser or heating gas cooler is completely bypassed by the air flow.

The control of the reheating expansion device takes place until the temperature flap reaches an x position within the defined position range.

If two temperature flaps are provided in the air conditioner, the opening cross section of the reheating expansion device is controlled until, ideally, both, but at least one of the temperature flaps reach an x position within the defined position range.

Alternatively, according to a preferred further development of the invention, it is provided that in an air conditioner with two temperature flaps the average value $\bar{x}$ of the x positions of the two temperature flaps is formed, at an average value $\bar{x}$ of the x position of the temperature flaps with $\bar{x} > x_1$, the opening cross-section of the reheating expansion device is reduced, and at an average value of the x positions of the temperature flaps with $\bar{x} < x_2$, the opening cross-section of the reheating expansion device is enlarged In this further development of the method according to the invention, the actual values of the x positions of the temperature flaps are averaged and compared with the $x_1$ and $x_2$ values.

Another alternative for an air conditioner with two temperature flaps is, according to a further development, that the temperature flap with the largest open position is determined, for an x position of the temperature flap with $x > x_1$, the opening cross-section of the reheating expansion device is reduced, and for an x position of the temperature flap with $x < x_2$, the opening cross-section of the reheating expansion device is enlarged.

Instead of the position of the temperature flap as the refrigeration system parameters indicating the required reheating power, other refrigeration system parameters can also be used.

Thus, according to a further development it is provided that the refrigeration system with an air conditioner which accommodates an evaporator and the interior heating condenser or heating gas cooler, a control apparatus, with which a target value for an outlet temperature at a vent of the air conditioner is provided, and a measuring device with which an actual value of the outlet temperature at the vent of the air conditioner is detected, and the target value of the outlet temperature is used as an air conditioning parameter.

With such a target value of the outlet temperature as an air conditioning system parameter a temperature threshold value with a tolerance band is determined for the target value for the outlet temperature, if the actual value of the outlet temperature is larger than the largest value of the tolerance band, the opening cross-section of the reheating expansion device is enlarged, and if the actual value of the outlet temperature is smaller than the smallest value of the tolerance band, the opening cross-section of the reheating expansion device is reduced.

Since this target outlet temperature is a direct control variable for the high pressure and thus for the target air temperature at the heating condenser or heating gas cooler, it indicates, of course, whether there is a large or low need for reheating.

Furthermore, according to a further development, it is provided that the refrigeration system is provided with an air conditioner with at least one air outlet which air conditioner accommodates an evaporator and the interior heating condenser or heating gas cooler, the cross section of the vent being adjustable by means of an adjustable vent flap, and the position of the vent flap is used as an air conditioning parameter.

Here, according to a further development,
an upper open position ($x_1$ position) and a lower open position ($x_2$ position, $x_2 < x_1$) are specified for the vent flap for defining a position range,
for an x position of the vent flap with $x > x_1$, the opening cross-section of the reheating expansion device is enlarged, and
for an x position of the vent flap with $x < x_2$, the opening cross-section of the reheating expansion device is reduced.

Suitable vents include the so-called dashboard vents, footwell vents and defrost vents.

Another alternative for using the position of the temperature flap as an air conditioning system parameter is, according to a further development, that
the refrigeration system has an air conditioner which accommodates an evaporator and the interior heating condenser or heating gas cooler, a control apparatus with which a target value is determined for the air temperature of the air flowing through the interior heating condenser or heating gas cooler and the air exiting from it, and a measuring device with which an actual value of the air temperature is detected, and
the target value of the air temperature of the air flowing through the interior heating condenser or heating gas cooler and the air exiting from it, is used as an air condition system parameter.

Here, according to a further development
a temperature threshold value with a tolerance band is determined for the target value of the air temperature of the air flowing through and exiting the interior heating condenser or heating gas cooler,
for an actual value of the air temperature larger than the largest value of the tolerance band, the opening cross-section of the reheating expansion device is enlarged, and
for an actual value of the air temperature smaller than the smallest value of the tolerance band, the opening cross-section of the reheating expansion device is reduced.

Another alternative for using the position of the temperature flap as an air conditioning system parameter is, according to a further development, that
the refrigerant inlet temperature of the refrigerant at the refrigerant inlet of the interior heating condenser or heating gas cooler is measured by means of a refrigerant inlet temperature sensor, and
the value of the measured refrigerant inlet temperature is used as an air conditioning system parameter.

Here, according to a further development
a temperature threshold value with a tolerance band is determined for the value of the refrigerant inlet temperature,
for a value of the refrigerant inlet temperature larger than the largest value of the tolerance band, the opening cross-section of the reheating expansion device is enlarged, and
for a value of the refrigerant inlet temperature smaller than the smallest value of the tolerance band, the opening cross-section of the reheating expansion device is reduced.

Finally, a further alternative for using the position of the temperature flap as an air conditioning system parameter, according to a further development, is that the high pressure at the interior heating condenser or heating gas cooler is measured by means of a pressure sensor, and
the pressure value of the high pressure is used as an air conditioning parameter.

Here, according to a further development
a pressure threshold value with a tolerance band is determined for the pressure value of the high pressure at the interior heating condenser or heating gas cooler,
for a pressure value larger than the largest value of the tolerance band, the opening cross-section of the reheating expansion device is enlarged, and
for a pressure value smaller than the smallest value of the tolerance band, the opening cross-section of the reheating expansion device is reduced.

According to a final particularly preferred development of the invention, the cross sectional opening of the reheating expansion device is dimensioned such that at a minimum cross-sectional opening of the reheating expansion member is closed and for a maximum cross-sectional opening, an area is released, which corresponds to the cross-sectional areas of the air conditioning ducts of the refrigerant circuit upstream and downstream of the reheating expansion device, that is to say, based on the dimensioning.

With such a reheating expansion device, cross-sections are established in reheating mode which are between the maximum and the minimum cross-sectional opening.

Further advantages, features and details of the invention will become apparent from the following description of preferred embodiments and with reference to the drawings.

DETAILED DESCRIPTION

Figure 1:
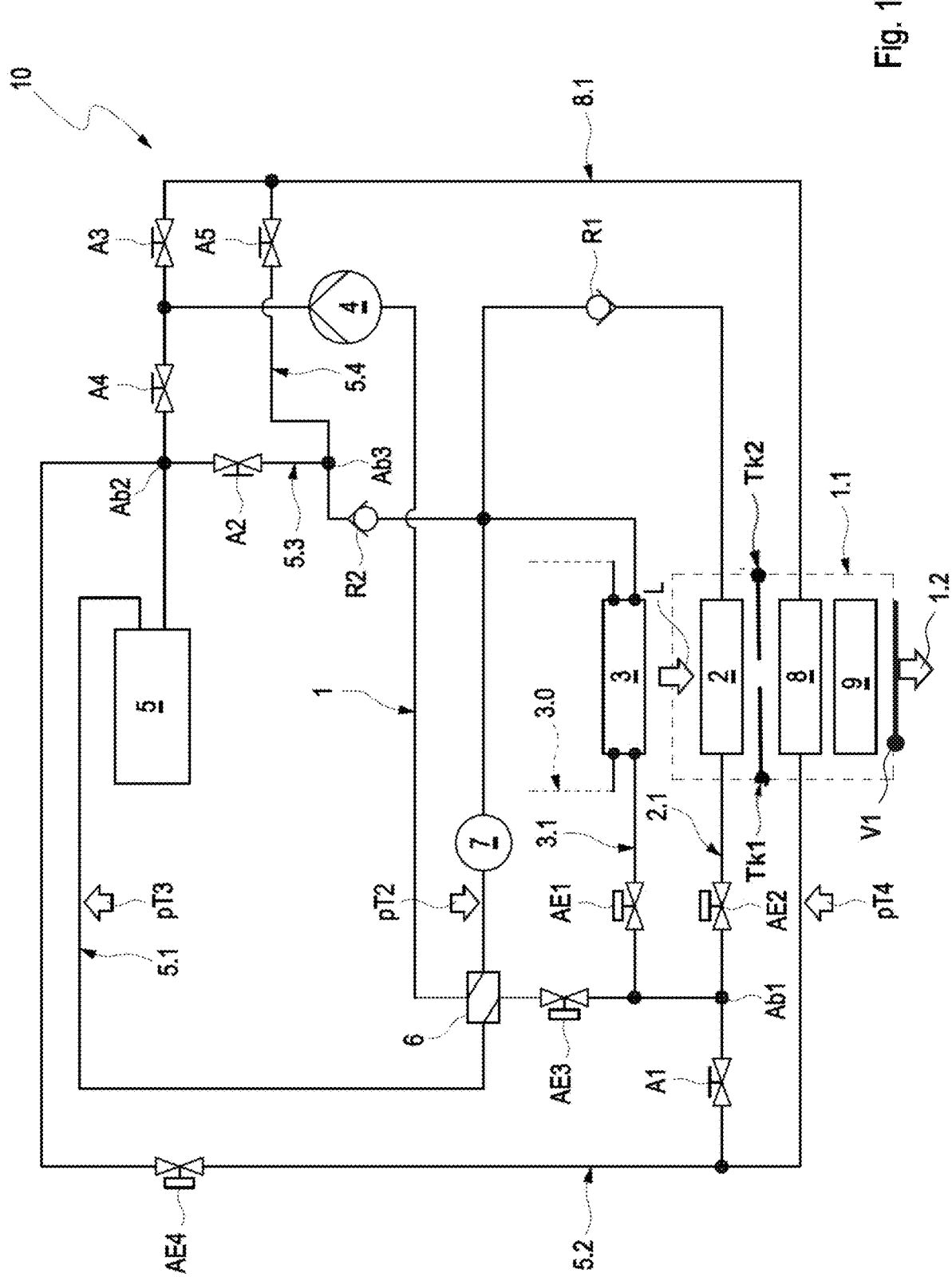
FIG. 1 shows a circuit diagram of a refrigeration system for performing the method according to the invention.

Before explaining the method according to the invention implemented by means of the refrigeration system 10 shown in FIG. 1, said refrigeration system 10 will be described with a refrigerant circuit 1.

Said refrigerant circuit 1 can be operated both in a refrigeration system mode (called AC mode for short) and in a heat pump mode and comprises two evaporators, namely an evaporator 2 and a chiller 3, which is thermally connected to a refrigerant circuit 3.0 for cooling, e. g., a high-voltage battery. An AC mode is understood to mean a refrigerant system—or cooling mode of the refrigerant circuit 1.

The refrigerant circuit 1 according to FIG. 1 consists of:
a refrigerant compressor 4,
an exterior heat exchanger 5 configured as a condenser or gas cooler with an expansion valve AE3 associated with the same in its function as a heat pump evaporator for the heating mode,
an interior heat exchanger 6,
an accumulator 7 on the low-pressure side,
an interior evaporator branch 2.1 with the evaporator 2 configured as a front evaporator and an upstream expansion valve AE2,
a check valve R1 connected downstream of the evaporator 2, which is fluidically connected to the inlet side of the refrigerant compressor 4 via the accumulator 7 and the low-pressure side section of the interior heat exchanger 6, a chiller branch 3.1 with the chiller 3, an expansion valve AE1 upstream of said chiller 3, the chiller 3 being utilized not only for cooling, for example, an electrical component of the vehicle is utilized also for realizing a water heat pump function using the waste heat of at least one electrical component, an AC and heat pump branch 5.1 to the exterior heat exchanger 5 and the expansion valve AE3, wherein, in the heating mode, the AC and heat pump branch 5.1 is fluidically connectable upstream to the interior evaporator branch 2.1 via the expansion valve AE3, to form a first branch point Ab1, and is fluidically connectable to the low-pressure inlet of the refrigerant compressor 4 downstream via a shut-off valve A2, whereas, in the AC mode, the AC and heat pump branch 5.1 is fluidically connectable with a shut-off valve A4 to the high pressure outlet of the refrigerant compressor 4 upstream, a heating branch 8.1 with an interior heating condenser 8 or heating gas cooler 8 (also called heating register), the heating branch 8.1 being fluidically connected to the high pressure outlet of the refrigerant compressor 4 upstream via a shut-off valve A3, and being fluidically connectable to the first branch point Ab1 downstream and thus to the interior evaporator branch 2.1 via a shut-off valve A1, a reheat branch 5.2 with a reheating expansion device AE4 configured as an expansion valve, the reheat branch 5.2 being fluidically connectable to the exterior heat exchanger 5 downstream to form a second branch point Ab2 and to the interior heating condenser 8 or heating gas cooler 8 upstream, a heat pump return branch 5.3 with a shut-off valve A2 and a check valve R2, the heat pump return branch 5.3 being connectable to the exterior heat exchanger 5 upstream via the second branch point Ab2 and to the accumulator 7 downstream, a suction branch 5.4 with a shut-off valve A5, the suction branch 5.4 being fluidically connected to the interior heating condenser 8 or heating gas cooler 8 upstream and to the shut-off valve A2 and the check valve R2 of the heat pump return branch 5.3 downstream via a third branch point Ab3, and an electrical heating element 9, for example configured as a high-voltage PTC heating element, as an auxiliary heater for a supply air flow L passed into the vehicle interior, which together with the interior heating condenser 8 or heating gas cooler 8 and the evaporator 2 is arranged in an air conditioner 1.1 downstream of the heating condenser 8 or heating gas cooler 8 and thus, also, of the evaporator 2.

Several pressure-temperature sensors are provided as sensors in the refrigerant circuit 1 according to FIG. 1 for controlling and regulating the system.

Thus, the refrigerant compressor 4 is associated with a first pressure-temperature sensor pT1 arranged at the high pressure outlet, furthermore a second pressure-temperature sensor pT2 at the outlet of the accumulator 7, a third pressure-temperature sensor pT3 at the outlet of the exterior heat exchanger 5, a fourth pressure-temperature sensor pT4 at the outlet of the heating condenser 8 or heating gas cooler 8 and, finally, a fifth pressure-temperature sensor pT5 at the low-pressure side outlet of the chiller 3.

With the two shut-off devices A3 and A4, the refrigerant flow, starting from the high-pressure side of the refrigerant compressor 4, is conducted either into the exterior heat exchanger 5 with the shut-off valve A4 open and the shut-off valve A3 closed, or flows in the heating branch 8.1 with the shut-off valve A3 open and shut-off valve A4 closed, in accordance with the state of said both shut-off valves. The two shut-off valves A3 and A4 can also be combined to form a 3-2-way valve and configured as a switch valve. The same applies to the two shut-off valves A2 and A5, which can be combined to form a 3-2-way valve as a switch valve.

In a final step the two switch valves can be combined and configured as a single compact electrical multi-way valve.

In the AC mode of the refrigerant circuit 1 according to FIG. 1, the refrigerant, which has been compressed to high pressure, flows starting from the refrigerant compressor 4 with the shut-off valve A 4 open into the exterior heat exchanger 5, the high-pressure section of the interior heat exchanger 6, via the expansion valve AE3 fully open and the first branch point Ab1 by means of the expansion valve AE2 in the interior evaporator branch 2.1 and/or in the chiller branch 3.1. From the chiller branch 3.1 the refrigerant flows back to the refrigerant compressor 4 via the accumulator 7 and the low-pressure section of the interior heat exchanger 6, while the refrigerant flows from the interior evaporator branch 2.1 via the check valve R1 and then can flow back to the refrigerant compressor 4 via the accumulator 7 and the low pressure section of the interior heat exchanger 6.

In this AC-mode, the heating branch 8.1 is closed by means of the shut-off valve A3, so that hot refrigerant, such as for example, R744, cannot flow through the heating gas cooler 8. For returning refrigerant from the inactive heating branch 8.1, however, the shut-off device A5 configured as a shut-off valve is opened and the refrigerant can flow in the direction A2 of the accumulator 7 via the shut-off device A5 and the check valve R2, when, at the same time, shut-off device A2 is closed.

Said first pressure-temperature sensor pT1 of the refrigerant circuit 1 is used for determining the refrigerant temperature and the high pressure of the compressed medium at the outlet of the refrigerant compressor 4. The monitoring of these two variables is used for monitoring the maximum permissible mechanical and thermal loads of the refrigeration system especially at the outlet of the refrigerant compressor 4, and, if necessary, to limit the system mode by curtailment measures, demanded by a control unit, e. g., a climate control apparatus, in order to not exceed the permissible maximum values.

Said second pressure-temperature sensor pT2 of the refrigerant circuit 1 is used for detecting underfilling, but also to set and monitor a required low pressure.

Said third pressure-temperature sensor pT3 of the refrigerant circuit 1, that is provided at the outlet side of the exterior heat exchanger 5 is primarily used for setting or monitoring system operating variables "optimum high pressure" in supercritical system mode or "sub-cooling after the exterior heat exchanger 5" in subcritical system mode.

Said fourth pressure-temperature sensor pT4 that in accordance with the refrigerant circuit 1 of FIG. 1 is arranged downstream of the heating condenser 8 or the heating gas cooler 8 is used for controlling, but also for monitoring the different operating modes of the refrigerant circuit 1, in particular in heat pump mode for actively flown-through heating condenser 8 or heating gas cooler 8 by a control apparatus, for example an air conditioning control apparatus.

Said fifth pressure-temperature sensor pT5 of the refrigerant circuit 1 is used for monitoring and regulating the degree of overheating at the outlet of the chiller 3.

The heating mode of the refrigerant circuit 1 according to FIG. 1 will be described below.

In the heating mode of the refrigerant circuit 1, utilizing the chiller 3 for implementing a water heat pump or utilizing the exterior heat exchanger 5 as a heat pump evaporator for implementing an air heat pump, the shut-off valve A4 is closed and the shut-off valve A3 is opened so that hot refrigerant, such as, for example R744 can flow into the heating branch 8.1.

To carry out the heating function by means of the chiller 3, the refrigerant compressed by means of the refrigerant compressor 4 flows through the opened shut-off valve A3 into the interior heating condenser 8 or heating gas cooler 8 to give off heat to a supply air stream L directed into the vehicle interior, and said refrigerant is then depressurized via the opened shut-off valve A1 and the first branch point Ab1 by means of the expansion valve AE1 into the chiller 3 for absorbing waste heat of the electrical and/or electronic components arranged in the refrigerant circuit 3.0. In this heating function the expansion valves AE3 and AE4 are closed, the shut-off valve A5 is closed and the shut-off valve A2 is opened wherein the shut-off valve A2 sucks off refrigerant transferred in the water-heat pump mode from the cable harness 5.1 and supplies it to the accumulator 7 via the check valve R2.

To carry out the heating function by means of the exterior heat exchanger 5 as a heat pump evaporator, the refrigerant compressed by means of the refrigerant compressor 4 flows through the opened shut-off valve A3 to give off heat to the supply air flow L directed into the passenger compartment, into the interior heating condenser 8 or heating gas cooler 8, and is then depressurized by means of the expansion valve AE3 via the shut-off valve A1 into the exterior heat exchanger 5 to absorb heat from the ambient air and then flows back to the refrigerant compressor 4 via the heat pump return branch 5.3. The expansion valves AE1, AE2 and AE4 remain closed, as does the shut-off valve A5.

An indirect delta connection is implemented in that when the shut-off valve A1 is open, the refrigerant compressed by the refrigerant compressor 4 is depressurized into the chiller 3 by means of the expansion valve AE 1, wherein at the same time no mass flow is generated on the refrigerant side, i.e., in the refrigerant circuit 3.0, that is to say, for example, the water used as a refrigerant stops flowing on the refrigerant side of the chiller 3 or refrigerant does not actively flow through the chiller 3. The expansion valves AE2, AE3 and AE4 remain closed in this circuit variation.

In reheat mode, the supply air flow supplied into the vehicle interior is first cooled by means of the evaporator 2 and thus dehumidified, and in order to warm up at least partially said supply air flow L then with the heat extracted from the supply air flow L and the heat supplied to the refrigerant via the compressor 4, by means of the interior heating condenser 8 or heating gas cooler 8. For this purpose, controllable and pivotable temperature flaps, usually two temperature flaps, namely a left and a right temperature flap Tk1 and Tk2 (illustrated schematically in FIG. 1) are arranged in the air conditioner 1.1 between the evaporator 2 and the heating condenser 8 or heating gas cooler 8 and are pivotable between an open position, which is referred to as 100% position, and a closed position, which is referred to as 0% position. Alternatively, it is also possible to connect the temperature flaps Tk1 and Tk2 downstream of the heating register.

In the 100% position, the entire supply air flow L flowing through the evaporator 2 is passed through the heating condenser 8 and heating gas cooler 8 and heated before it can flow into the passenger compartment of the vehicle.

In the 0% position, the entire supply air flow L flowing through the evaporator 2 flows in the bypass around the heating condenser 8 or heating gas cooler 8 without heating and thus without absorbing heat into the passenger compartment.

In an x position of the temperature flaps Tk1 and Tk2 with 0%<x<100%, these temperature flaps are only partially open, so that only a partial air flow of the supply air flow L flowing through the evaporator 2 is passed through the heating condenser 8 or heating gas cooler 8 to then to be mixed with the remaining cooled and dehumidified partial air flow. The supply air flow L heated in this way is supplied to the passenger compartment of the vehicle. For example, a 50% position indicates that the temperature flap Tk1 or Tk2 is only half open, i.e. 50%.

A reheat mode of the refrigerant circuit 1 is performed in accordance with the heat balance in different ways.

If there is excess heat in said reheat mode, additionally heat is released to the surroundings of the vehicle via said exterior heat exchanger 5, in addition to the heat release to the supply air of the passenger compartment via the interior heating condenser 8 or heating gas cooler 8 before the refrigerant flows back to the refrigerant compressor 4 via the evaporator 2. For this purpose, the reheating expansion device AE4 is controlled to be in its 100% position, thus completely open, wherein the pressure level of the refrigerant assumes the pressure level of the heating condenser 8 or heating gas cooler 8 for condensing and for cooling. Then, the refrigerant is expanded into the evaporator 2 to a low pressure by means of the expansion valve AE2. The heating condenser 8 or heating gas cooler 8 and the exterior heat exchanger 5 thus form the high-pressure side of the system downstream of the refrigerant compressor 4 and, apart from pressure losses, work on the same pressure level, at least as long as there is no control intervention in the "close" direction on the part of the reheating expansion device.

If there is excess heat in said reheat mode of need for reheating or the required reheating power is set at the heating condenser 8 or heating gas cooler 8 by means of the temperature flaps Tk1 and Tk2 by a control apparatus regulating the refrigeration system 10.

The x value of the position of the temperature flaps Tk1 and Tk2 thus shows, as an air conditioning system parameter, the reheating power determined, for example, from the temperature setting of a vehicle occupant. If the temperature flaps Tk1 and Tk2 are in the 0% position, there is no need for reheating. If, on the other hand, the temperature flaps Tk1 and Tk2 are in the 100% position, there is a maximum need for reheating.

In accordance with the x position of the temperature flaps Tk1 and Tk2, the opening cross-section of the reheating expansion device AE4 is reduced or closed, or enlarged or opened, i.e. it is either throttled or de-throttled.

Furthermore, in accordance with the x position of the temperature flaps Tk1 and Tk2, the reheating expansion device AE4 is controlled and regulated in such a way that the temperature flaps Tk1 and Tk2 assume a half-way x position between their open and closed positions. For this purpose, a position range between an $x_1$ position as the upper open position and an $x_2$ position as the lower open position with $x_2 < x_1$ is defined with the aim of regulating the reheating expansion device AE4 in such a way that the temperature flaps Tk1 and Tk2 assume an x position within this position range. The position range can be selected, for example, with $x_1 = 60\%$ and $x_2 = 40\%$.

The advantage of this approach is that with temperature flaps Tk1 and Tk2, the position of which is within this position range, a more dynamic adaptation to changed temperature conditions is made possible.

If the temperature flaps Tk1 and Tk2 in a large x position indicate a high need for reheating, the reheating expansion device AE4 is throttled in small steps, i.e., the opening cross-section is reduced in small steps, as a result of which a medium pressure level is set in the exterior heat exchanger 5 and at the same time, in the heating condenser 8 or heating gas cooler 8, the high pressure p_HD and thus also the refrigerant temperature rises, i.e., the reheating power is increased. The throttling of the reheating expansion device AE4 is continued until both temperature flaps Tk1 and Tk2 are pivoted into an x position within the position range, that is to say, for example, have assumed an x position with x<60%.

Conversely, for a small need for reheating (the temperature flaps Tk1 and Tk2 are in an x position with, for example, x<40%) the de-throttling of the reheating expansion device AE4, that is to say, the enlarging of its opening cross-section, can be made gradually, and in doing so, a decrease in both high pressure and the temperature in the heating condenser 8 or heating gas cooler 8 can be achieved, until both temperature flaps Tk1 and Tk2 are opened wide enough so that their x positions are below the value $x_2$ within the position range or even permanently, i.e., a very small need for reheating is set.

Figure 2:
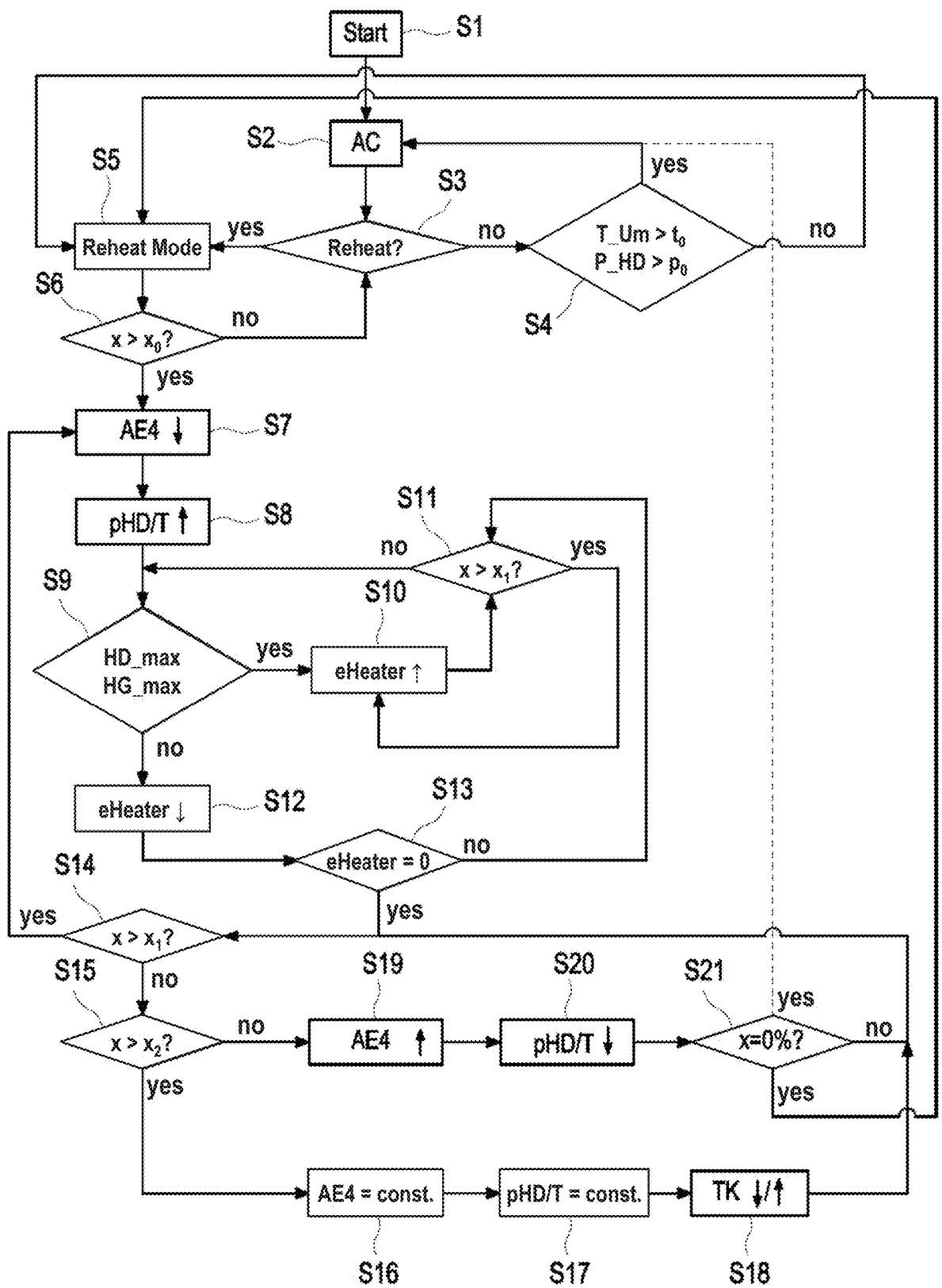
FIG. 2 shows a flow chart to explain the method according to the invention.

This reheat mode is explained in detail in the event of excess heat using the flow chart according to FIG. 2.

After the start of the refrigeration system 10 (method step S1), said refrigeration system 10 is controlled (method step S2) to be in a refrigerant system mode (AC mode). In a subsequent method step S3 it is checked whether there is a need for reheating. If there is no need for reheating, there is branching out to a method step S4, with which, at an ambient temperature of higher than to of, for example, 25° C., or at a high pressure p_HD of the refrigerant circuit 1 of higher than po, its value can be set, for example, to 100 bar, there is branching out to method step S2, or if this is not the case, to a method step S5.

If there is a need for reheating according to method step S3, then, according to method step S5, the refrigerant circuit 1, according to FIG. 1, is controlled to be in the reheat mode described above, in which the high-pressure compressed refrigerant flows into the interior heating condenser 8 or heating gas cooler 8 via the shut-off valve A3 and from there is passed back into the exterior heat exchanger 5 via the reheating expansion device AE4, and from there back to the refrigerant compressor 4 via the shut-off valve A2, the check valve R2, the accumulator 7 and the interior heat exchanger 6.

In the following method step S6 it is checked whether $x > x_0$, where $x_0$ is synonymous with the starting position of the temperature flaps with a value of, for example, 80%, that is, whether the temperature flaps Tk1 and Tk2 are open more than 80%, i.e. it is checked whether there is a large need for reheating. If the temperature flaps Tk1 and Tk2 are in an x position with 80%<x≤100% a method step S7 is performed, otherwise branching back to method step S3 is performed.

As a result of the high reheating requirement for case $x > x_0$, the reheating expansion device AE4 is throttled, i.e. its opening cross-section is gradually and continuously reduced by a predetermined amount, forming a medium pressure level. According to method step S8 this causes an increase of the high pressure p_HD (pHDT) in the interior heating condenser 8 or heating gas cooler 8 and thus also an increase of the temperature T (TT) of the refrigerant in the heating condenser 8 or heating gas cooler 8.

Then, according to a method step S9, it is checked whether the refrigeration system is at the operating point of maximum power, i.e., whether the high pressure p_HD is at maximum (p_HD_max) and/or the temperature T_HG of the hot gas is at maximum (T_HG_max). At this operating point, according to method step S10, the heating power can be increased only with the electrical heating element 9 as an auxiliary heater.

If the refrigeration system 10 is at this operating point of maximum power, according to method step 10, the electrical heating element 9 is connected as an auxiliary heater or its heating power is increased by a predetermined amount in order to achieve the required temperature of the supply air flow for the interior.

In a subsequent method step S11 it is checked whether $x > x_1$, i.e., whether the temperature flaps Tk1 and Tk2 are open more than $x_1$ and whether there is a great need for reheating. If the temperature flaps Tk1 and Tk2 are in an x position with $x_1 < x \leq 100\%$, there is branching back to method step S10, otherwise back to method step S9.

If the conditions of method step S9 do not apply, i.e., the refrigeration system 10 has neither a maximum high pressure p_HD_max nor a maximum hot gas temperature T_HG_max, the electrical heating power of the electrical heating element 9 is reduced by a predetermined amount (eHeater↓) according to method step S12. In a subsequent step S13 it is checked whether the electric heating element 9 does not supply any more additional heating power, i.e., whether eHeater=0?. If this is not the case, there is branching back to method step S11.

If no additional heating power is generated, the positions of the temperature flaps Tk1 and Tk2 are checked according to method step S14 to determine whether they are open more than $x_1$, i.e., whether $x > x_1$ and whether there is, accordingly, a large need for reheating. If the temperature flaps Tk1 and Tk2 are in an x position with $x_1 < x < 100\%$, there is branching back to method step S7, otherwise a method step S15 is carried out.

Method step S15 is used to check whether $x > x_2$, i.e., whether the temperature flaps Tk1 and Tk2 are open more than $x_2$. If the temperature flaps Tk1 and Tk2 are in an x position with $x_2 < x < 100\%$, this means, taking into account method step S14, that the temperature flaps Tk1 and Tk2 are in an x position with 40%<x<60% and are thus within the defined position range. In this case, with the following method step S16, the opening cross-section of the reheating expansion device AE4 is kept constant (AE4=constant) and thus the high pressure p_HD and thus also the refrigerant temperature in the heating condenser or heating gas cooler 8 remain constant (see method step S17, pHD/T=constant). Using these x positions, the temperature flaps Tk1 and Tk2 can be adjusted according to the need for reheating, that is to say, they are either opened more (Tk1) or closed more (T14) or maintain their position (Tk=const.). Then, there is branching back to method step S14.

If, according to method step S15, the temperature flaps Tk1 and Tk2 with respect to their x-positions do not meet the condition $x > x_2$, i.e., only a small need for reheating is indicated, the following method step S19 is used to perform a de-throttling of the reheating expansion device AE4 by increasing its opening cross section by a certain amount (AE4↑), as a result of which the high pressure and thus the refrigerant temperature in the heating condenser 8 and heating gas cooler 8 decreases (cf., method step S20, pHD/T↓).

In a subsequent method step S21, it is checked whether the temperature flaps Tk1 and Tk2 are closed, that is, whether they have assumed an x position with x=0%. If this is not the case, branching is performed back to method step S14.

In the other case, that is to say, when the temperature flaps Tk1 and Tk2 are closed, branching is performed back to method step S5 and thus the refrigeration system is operated in reheat mode, in particular with system loads with an ambient temperature of less than to. Alternatively, there may also be branching back to method step S2 (illustrated with a dashed line) when there are high system loads, for example, at an ambient temperature of higher than to, for example, of 25° C.

The inventive method according to FIG. 2 shows that a variation of the high pressure between the refrigerant compressor 4 and the reheating expansion device AE4 caused by a throttling or de-throttling the reheating expansion device AE4 can be used as a heating measure, wherein in this method the chiller branch 3.1 can be connected in parallel to the evaporator branch 2.1, and thus the waste heat of the chiller 3 can be transferred at least partially to the supply air flow L of the vehicle's passenger compartment via the interior heating condenser 8 or heating gas cooler 8.

At least one further optional interior evaporator (rear evaporator) usually connected in parallel for the rear compartment is not shown.

In the described exemplary embodiment of the method according to the invention, the x position of the temperature flap or the x positions of the temperature flaps is or are used as refrigeration system parameter(s).

Instead of the position of the temperature flap as the refrigeration system parameters indicating the required reheating power, the following refrigeration system parameters can also be used.

The target value of the outlet temperature at at least one vent of the air conditioner, which is provided by a control apparatus of the refrigeration system, is suitable as an air-conditioning system parameter. This target value represents a direct manipulated variable for the high pressure and thus also for the target temperature on the interior heating condenser 8 or heating gas cooler 8. The actual value of the outlet temperature is determined with a measuring device 1.2, for example a temperature sensor.

With such a target value of the outlet temperature as an air conditioning system parameter
a temperature threshold with a tolerance band is determined for the target value of the outlet temperature,
for an actual value of the outlet temperature larger than the largest value of the tolerance band, the opening cross-section of the reheating expansion device is enlarged, and
for an actual value of the outlet temperature smaller than the smallest value of the tolerance band, the opening cross-section of the reheating expansion device is reduced.

An air conditioner comprises at least one vent, the vent cross section of which can be set by means of an adjustable vent flap V1 (shown schematically in FIG. 1). The position of such a vent flap V1 can also be used as an air conditioning parameter. Suitable vents include the so-called dashboard vents, footwell vents and defrost vents.

To carry out the respective method
an upper open position ($x_1$ position) and a lower open position ($x_2$ position, $x_2 < x_1$) are specified for the vent flap V1 for defining a position range,
for an x position of the vent flap V1 with $x > x_1$, the opening cross-section of the reheating expansion device is enlarged, and
for an x position of the vent flap V1 with $x < x_2$, the opening cross-section of the reheating expansion device is reduced.

Another alternative for using the position of the temperature flap as an air conditioning system parameter is that a target value for the air temperature of the air flowing through and exiting the interior heating condenser or heating gas cooler is determined by a control apparatus of the refrigeration system, and this target value of the air temperature of the air flowing through and exiting the interior heating condenser or heating gas cooler is used as an air conditioning system parameter. The actual value of this air temperature is determined with at least one measuring device 1.2, for example a temperature sensor.

For this purpose,
a temperature threshold with a tolerance band is determined for the target value of the air temperature of the air flowing through and exiting the interior heating condenser or heating gas cooler,
for an actual value of the air temperature larger than the largest value of the tolerance band, the opening cross-section of the reheating expansion device is enlarged, and
for an actual value of the air temperature smaller than the smallest value of the tolerance band, the opening cross-section of the reheating expansion device is reduced.

Another alternative for using the position of the temperature flap as an air conditioning parameter is that
the refrigerant inlet temperature of the refrigerant at the refrigerant inlet of the interior heating condenser or heating gas cooler is measured by means of a refrigerant inlet temperature sensor, and
the value of the measured refrigerant inlet temperature is used as an air conditioner parameter.

For this purpose
a temperature threshold value with a tolerance band is determined for the value of the refrigerant inlet temperature,
for a value of the refrigerant inlet temperature larger than the largest value of the tolerance band, the opening cross-section of the reheating expansion device is enlarged, and
for a value of the refrigerant inlet temperature smaller than the smallest value of the tolerance band, the opening cross-section of the reheating expansion device is reduced.

Finally, another alternative for using the position of the temperature flap as an air conditioning parameter is that
the high pressure at the interior heating condenser or heating gas cooler is measured by means of a pressure sensor, and
the pressure value of the high pressure is used as an air conditioning parameter.

For this purpose
a pressure threshold value with a tolerance band is determined for the pressure value of the high pressure at the interior heating condenser or heating gas cooler,
for a pressure value larger than the largest value of the tolerance band, the opening cross-section of the reheating expansion device is enlarged, and
for a pressure value smaller than the smallest value of the tolerance band, the opening cross-section of the reheating expansion device is reduced.

The inventive method according to the exemplary embodiment according to FIG. 2 can be performed with single temperature flap Tk1 or with two temperature flaps Tk1 and Tk2 or alternatively with more than two temperature flaps Tkn with n≥1.

Alternatively, with an air conditioner with two temperature flaps, it is possible to average the x positions of the temperature flaps and to regulate the average value x to the position range with the upper open position as $x_1$ position and the lower open position as $x_2$ position.

At x positions of the temperature flaps with $\bar{x} > x_1$, the opening cross-section of the reheating expansion device AE4 is reduced, while at x positions of the temperature flap with $\bar{x} < x_2$, the opening cross-section of the reheating expansion device is enlarged.

Another alternative at an air conditioner with two temperature flaps is that
- the temperature flap with the largest open position is determined,
- for an x position of this temperature flap with $x > x_1$, the opening cross-section of the reheating expansion device is reduced, and
- for an x position of the temperature flap with $x < x_2$, the opening cross-section of the reheating expansion device is enlarged.

In this case, the values $x_1$ and $x_2$ relate to the position range in which the temperature flap with the largest open position is regulated.

In this case, the second temperature can work unnoticed up to the moment at which this second temperature valve has the larger opening position and in turn becomes the reference variable.

Generally speaking, a maximum value query among the x positions of the at least two temperature flaps takes place, wherein the resulting maximum value in each case impacts the control process and all other values remain unnoticed.

In the case of air conditioners with only one temperature flap, their position evaluation is limited to a single x value for which the method according to the invention described above is carried out. If there are more than two temperature flaps in an air conditioner, the above-described method according to the invention is functionally expanded accordingly.

If there is sufficient heating power in the refrigerant circuit 1, in particular at the heating condenser 8 or heating gas cooler 8, refrigerant only flows through the evaporator 2 in that the heating condenser 8 or heating gas cooler 8 is fluidically connected to the evaporator 2 downstream by means of the opened shut-off device A1 via the expansion valve AE2, wherein the expansion valve AE1 associated with the chiller 3 as well as the expansion valves AE3 and AE4 leading to the exterior heat exchanger 5 are blocked. The refrigerant flows from the evaporator 2 via the check valve R1 via the accumulator 7 and the interior heat exchanger 6 back to the refrigerant compressor 4, wherein the heat absorbed in the evaporator 2 together with the heat flow introduced via the refrigerant compressor 4 is released again to a supply air flow L passed into the vehicle interior via the heating condenser 8 or heating gas cooler 8.

If there is a lack of heat in the refrigerant circuit 1, i.e., if there is a heating power deficit at the heating condenser 8 or heating gas cooler 8, the chiller 3 by opening the expansion valve AE1 and/or the exterior heat exchanger 5 by means of the expansion device AE3 are/is connected in parallel in addition to the evaporator 2.

A parallel use of the waste heat from the chiller 3 and the ambient heat by means of the exterior heat exchanger 5 is also possible.

The branch with the shut-off valve A5 serves as a suction branch 5.4 to use it in the AC mode of the refrigerant circuit 1 according to FIG. 1 with opened shut-off valve A5 and closed shut-off valves A1 and A3 to suction off refrigerant from the heating branch 8.1. For heating measures with active flow through heating condenser 8 or heating gas cooler 8, the shut-off valve A5 always remains closed.

The invention claimed is:

1. A method for operating a refrigeration system for a vehicle, the refrigerant system comprising a refrigerant circuit configured to function as a heat pump and provided with an exterior heat exchanger, an interior heating condenser or gas cooler, and a reheating expansion valve,
   wherein the exterior heat exchanger is configured to operate as a condenser or gas cooler for a refrigeration mode or as a heat pump evaporator for a heat pump mode,
   wherein the interior heating condenser or gas cooler is configured to carry out a heating mode, and
   wherein the reheating expansion valve is fluidically arranged between the interior heating condenser or gas cooler and the exterior heat exchanger,
   the method comprising:
   controlling, during a reheating mode of the refrigerant system, an opening cross-section of the reheating expansion valve based on at least one refrigeration system parameter indicating a required reheating power.

2. The method according to claim 1, wherein the interior heating condenser or gas cooler is arranged within an air conditioner through which a supply air flows and which comprises an evaporator,
   wherein the air conditioner further comprises at least one temperature flap which is pivotable between an open and a closed position and which is configured to direct at least a portion of the supply air flowing through the evaporator over the interior heating condenser or gas cooler based on a position of the at least one temperature flap, and
   wherein the at least one refrigeration system parameter comprises the position of the at least one temperature flap.

3. The method according to claim 2, wherein:
   when the position of the at least one temperature flap is greater than a predetermined upper open position, the opening cross-section of the reheating expansion valve is reduced, and
   when the position of the at least one temperature flap is less than a predetermined lower open position, the opening cross-section of the reheating expansion valve is increased.

4. The method according to claim 2, wherein the air conditioner comprises a first temperature flap and a second temperature flap, and
   wherein the position of the at least one temperature flap is defined as an average value of a respective position of the first temperature flap and a respective position of the second temperature flap.

5. The method according to claim 2, wherein the air conditioner comprises a first temperature flap and a second temperature flap, and
   wherein the position of the at least one temperature flap is defined based on whichever of the first temperature flap and the second temperature flap has a largest open position.

6. The method according to claim 1, wherein the interior heating condenser or gas cooler is arranged within an air conditioner through which a supply air flows and which comprises an evaporator,
wherein the refrigeration system further comprises a controller configured to set a target value for an outlet temperature of the supply air exiting the air conditioner and a sensor for measuring an actual value of the outlet temperature of the supply air exiting the air conditioner, and
wherein the at least one refrigeration system parameter comprises the target value.

7. The method according to claim 6, wherein the target value is associated with a tolerance band such that:
when the actual value exceeds a largest value of the tolerance band, the opening cross-section of the reheating expansion valve is increased, and
when the actual value exceeds a lowest value of the tolerance band, the opening cross-section of the reheating expansion valve is reduced.

8. The method according to claim 1, wherein the interior heating condenser or gas cooler is arranged within an air conditioner through which a supply air flows and which comprises an evaporator,
wherein the air conditioner further comprises at least one vent flap which is pivotable between an open and a closed position and which is configured to control an outflow of the supply air from the air conditioner based on a position of the at least one vent flap, and
wherein the at least one refrigeration system parameter comprises the position of the at least one vent flap.

9. The method according to claim 8, wherein:
when the position of the at least one vent flap is greater than a predetermined upper open position, the opening cross-section of the reheating expansion valve is increased, and
when the position of the at least one vent flap is less than a predetermined lower open position, the opening cross-section of the reheating expansion valve is reduced.

10. The method according to claim 1, wherein the interior heating condenser or gas cooler is arranged within an air conditioner through which a supply air flows and which comprises an evaporator,
wherein the refrigeration system further comprises a controller configured to set a target value for a temperature of the supply air passing over or exiting from the interior heating condenser or gas cooler and a sensor for measuring an actual value of the temperature of the supply air passing over or exiting from the interior heating condenser or gas cooler, and
wherein the at least one refrigeration system parameter comprises the target value.

11. The method according to claim 10, wherein the target value is associated with a tolerance band such that:
when the actual value exceeds a largest value of the tolerance band, the opening cross-section of the reheating expansion valve is increased, and
when the actual value exceeds a lowest value of the tolerance band, the opening cross-section of the reheating expansion valve is reduced.

12. The method according to claim 1, wherein the at least one refrigeration system parameter comprises an inlet refrigerant temperature of refrigerant entering the interior heating condenser or gas cooler as measured by a sensor.

13. The method according to claim 12, wherein the inlet refrigerant temperature is associated with a tolerance band such that:
when the inlet refrigerant temperature exceeds a largest value of the tolerance band, the opening cross-section of the reheating expansion valve is increased, and
when the inlet refrigerant temperature exceeds a lowest value of the tolerance band, the opening cross-section of the reheating expansion valve is reduced.

14. The method according to claim 1, wherein the at least one refrigeration system parameter comprises a pressure of refrigerant entering the interior heating condenser or gas cooler as measured by a sensor.

15. The method according to claim 14, wherein the pressure is associated with a tolerance band such that:
when the pressure exceeds a largest value of the tolerance band, the opening cross-section of the reheating expansion valve is increased, and
when the pressure exceeds a lowest value of the tolerance band, the opening cross-section of the reheating expansion valve is reduced.

16. The method according to claim 1, wherein control of the cross-section of the reheating expansion valve ranges from zero, or a state in which the reheating expansion valve is completely closed, to an area which corresponds to that of the refrigerant circuit directly upstream and/or downstream of the reheating expansion valve, or a state in which the reheating valve is completely open and does not constrict flow through the refrigerant circuit.

* * * * *